United States Patent [19]

Kyts

[11] 4,063,985
[45] Dec. 20, 1977

[54] HEAT-SEALING STRAPPING TOOL AND TEMPERATURE REGULATOR THEREFOR

[75] Inventor: Robert B. Kyts, Chicago, Ill.

[73] Assignee: Interlake, Inc., Chicago, Ill.

[21] Appl. No.: 701,345

[22] Filed: June 30, 1976

[51] Int. Cl.² .................... B32B 31/00; H05B 1/02
[52] U.S. Cl. .................... 156/359; 156/494; 156/499; 219/511
[58] Field of Search ............... 156/306, 583, 494, 583, 156/499, 359; 219/511; 337/100, 2

[56] References Cited

U.S. PATENT DOCUMENTS

| | | | |
|---|---|---|---|
| 3,368,323 | 2/1968 | Wood | 156/499 |
| 3,397,105 | 8/1968 | Takami | 156/499 |
| 3,553,624 | 1/1971 | Dalzell et al. | 337/100 |
| 3,581,985 | 6/1971 | Thorsteinsson | 337/100 |
| 3,914,153 | 10/1975 | Sato | 156/499 |
| 3,944,460 | 3/1976 | Karr | 156/494 |

*Primary Examiner*—Douglas J. Drummond
*Attorney, Agent, or Firm*—Vogel, Dithmar, Stotland, Stratman & Levy

[57] ABSTRACT

A manually operable combination strapping tool for applying plastic strapping around an object includes a strap-tensioning and gripping mechanism for holding the strap in a tensioned loop around the object with the supply portion of the strap overlapping the leading end thereof, an electric heating element for melting the facing overlapping strap portions, and pressure means for pressing together the melted overlapping strap portions to form a joint therebetween. A heat regulating apparatus for the heating element includes a bimetallic relay having a reference heating means connected in parallel with the heating element for being heated at a rate such that the temperature of the reference heating means is proportional to the temperature of the associated heating element, and normally closed bimetallic switch contacts connected in series between the associated source of electric power and the parallel combination of the reference heating means and heating element, the switch contacts being responsive to heating of the reference heating means to a reference temperature for switching to an open condition de-energizing the reference heating means and the heating element, the switch means being responsive to the cooling of the reference heating means below the reference temperature for switching to a closed condition for energizing the reference heating means and heating element.

16 Claims, 12 Drawing Figures

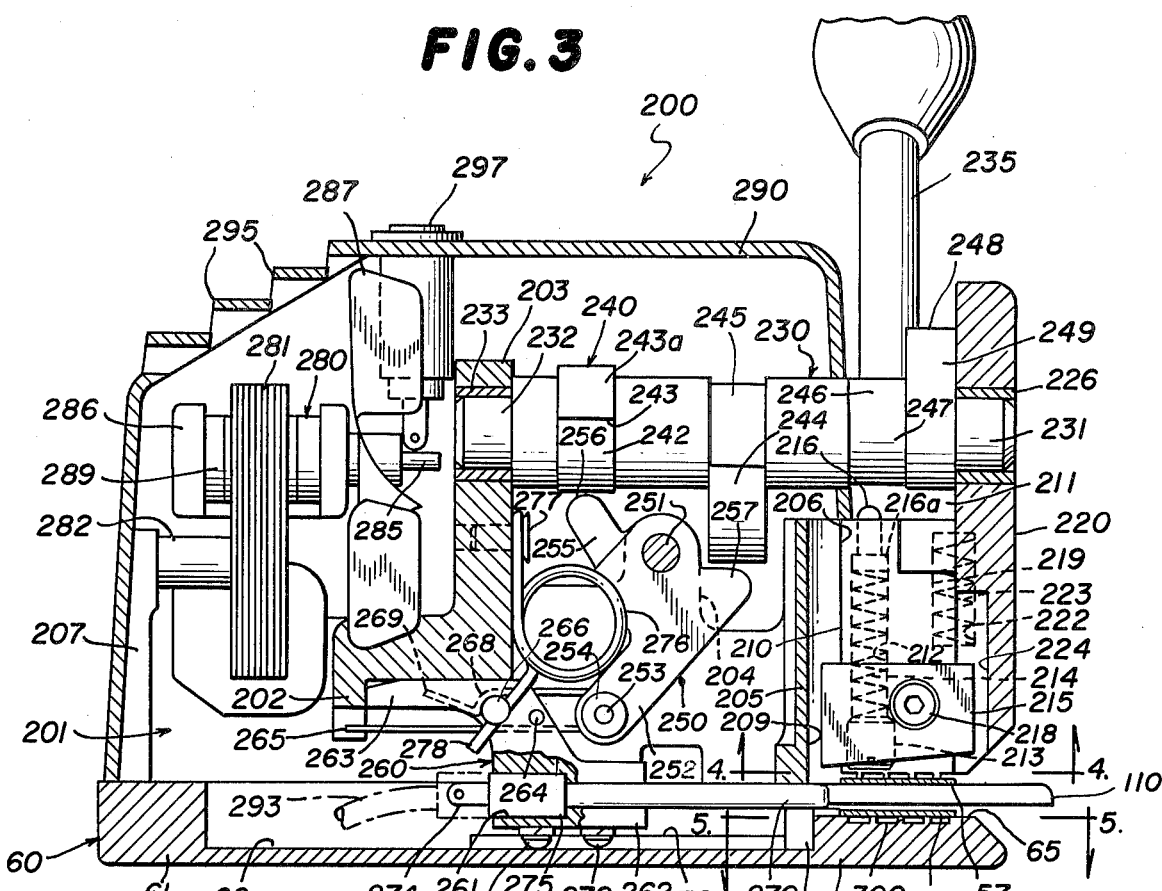

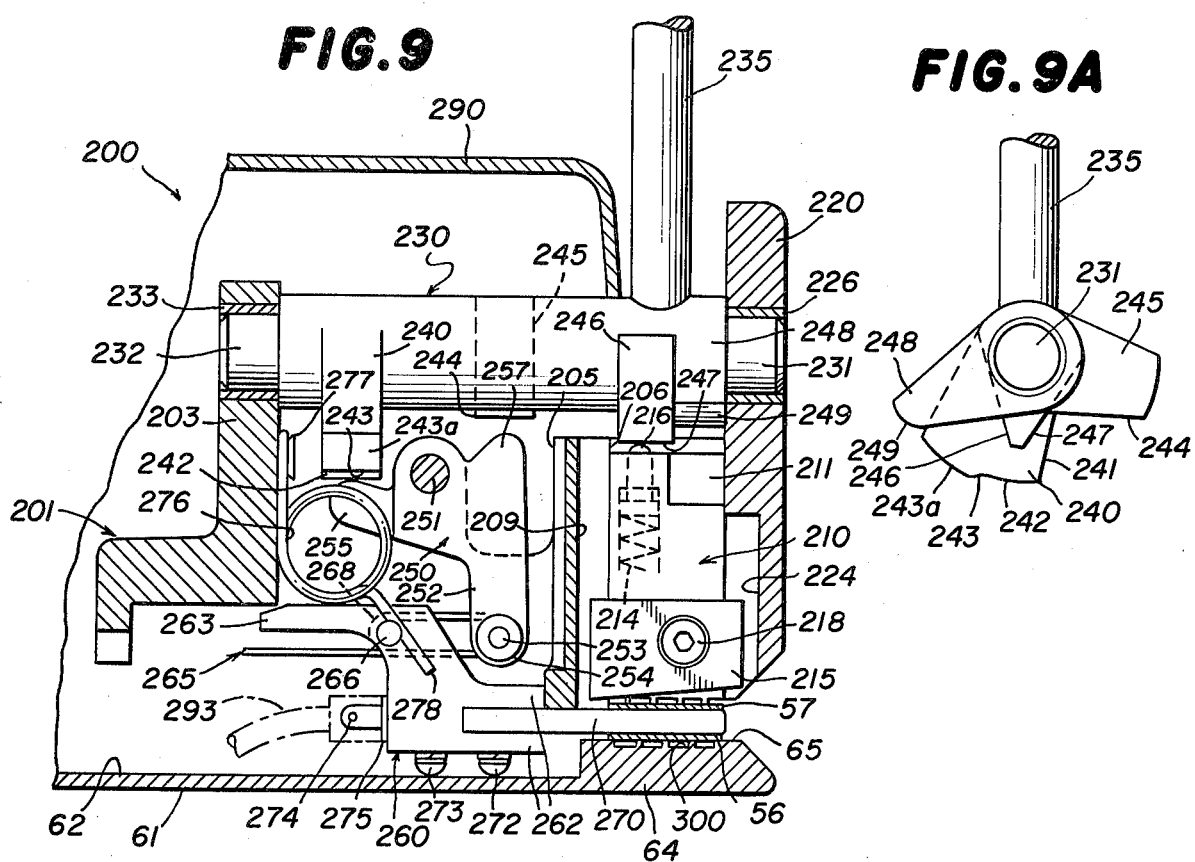
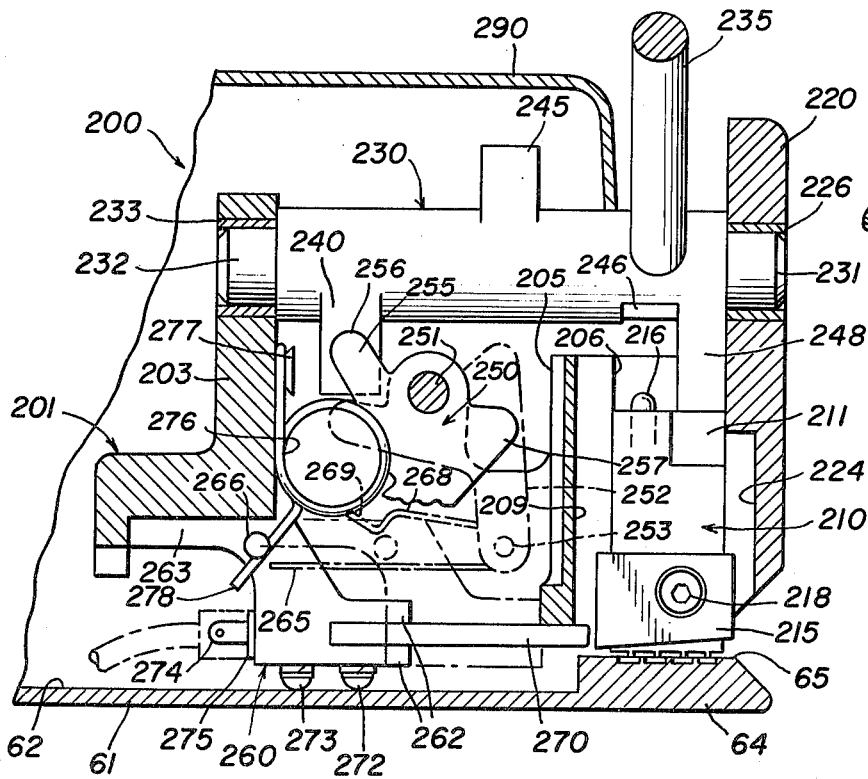

HEAT-SEALING STRAPPING TOOL AND TEMPERATURE REGULATOR THEREFOR

BACKGROUND OF THE INVENTION

The present invention relates to apparatus for applying strapping around an object. More particularly, the invention relates to apparatus for tensioning plastic strapping in a loop around an object and forming a heat-sealed joint in the strap loop for securing it about the object.

The present invention is an improvement of the strapping apparatus disclosed in U.S. Pat. No. 3,944,460, issued to G. A. Karr on Mar. 16, 1976, entitled "COMBINATION STRAPPING TOOL FOR PLASTIC STRAP", and in my copending Application Ser. No. 701,306, filed June 30, 1976 and entitled "APPARATUS AND METHOD FOR APPLYING PLASTIC STRAP", which patent and copending application are both assigned to the assignee of the present invention. Those strapping tools include an electric resistance-type heating element movable in use to and from a heating position disposed between the overlapping strap portions for melting the facing portions thereof.

In order to achieve uniformity of bonding of the overlapping strap portions in successive operations of the strapping tool, it is necessary to maintain the temperature of the heating element at a predetermined optimum temperature. In such prior tools, accurate maintenance of the temperature of the heating element has been hindered by variations in the voltage of the electrical power source, which variations affect the temperature to which the heating element is heated. Such variations in the temperature of the heating element result in nonuniformity of joints formed by the strapping tool and may, in severe cases, result in failure of the joints. Furthermore, it has been found that the resistance of no two heating elements is exactly the same, so that there may be considerable variation in temperature among the heating elements of several strapping tools.

SUMMARY OF THE INVENTION

It is an important feature of the present invention that there is provided a combination tensioning and heat-sealing tool for applying plastic strapping around an object, the tool including a heating element and means for accurately regulating the temperature thereof at a predetermined temperature.

More specifically, it is an important feature of the present invention that there is provided in connection with a heat-sealing type strapping tool for applying plastic strapping around an object, a temperature regulating means for accurately regulating the temperature of the heating element independently of variations in the voltage of the electrical power source.

It is another feature of this invention that the heating element is maintained at a constant temperature which is proportional to the temperature of a reference heating means.

Still another feature of this invention is that the reference heating means is adapted to be connected in parallel with the heating element for being heated at a rate such that the temperature of the reference heating means is proportional to the temperature of the heating element, the apparatus including temperature-responsive switch means connected in series between the associated source and the parallel combination of the reference heating means and the heating element and having a normal closed condition for energizing the heating element and the reference heating means and an open condition for de-energizing the heating element and the reference heating means.

These features are achieved, and it is an object of the present invention to obtain these advantages by providing in a heat-sealing strapping apparatus including an electric heating element connected across a source of electric power, temperature regulating apparatus for said heating element comprising reference heating means adapted to be connected in parallel with the associated electric heating element for being heated at a rate such that the temperature of the reference heating means is proportional to the temperature of the heating element, and temperature-responsive switch means connected in series between the associated source and the parallel combination of the reference heating means and the heating element and having a normal closed condition for energizing the heating element and the reference heating means and an open condition for de-energizing the heating element and the reference heating means, the switch means being responsive to the heating of the reference heating means to a reference temperature proportional to a predetermined temperature of the heating element for switching to the open condition thereof, the switch means being responsive to the cooling of the reference heating means below the reference temperature for switching to the closed condition thereof, whereby the temperature of the heating element is maintained at the predetermined temperature independent of variations in the voltage of the associated source.

In connection with the foregoing object, it is another object of this invention to provide temperature regulating apparatus of the type set forth, wherein the reference heating means and temperature-responsive switch are parts of a bimetallic relay.

It is another object of this invention to provide strapping apparatus for securing a length of plastic strap around an object, the apparatus comprising a frame, strap-gripping means mounted on the frame for holding the strap encircled in a loop in a tensioned condition about the object with the leading end of the strap overlapping the supply portion thereof, an electric heating element adapted to be connected across an associated source of electric power for effecting melting of the facing overlapping portions of the strap, and temperature regulating apparatus of the type set forth.

In connection with the foregoing object, still another object of this invention is to provide strapping apparatus of the type set forth, wherein the heating element is movable in use between a strap-heating position disposed between the overlapping portions of the strap for contact therewith to effect melting thereof, and a retracted position displaced from between the overlapping portions of the strap and out of contact therewith.

Further features of the invention pertain to the particular arrangement of the parts of the strapping and temperature regulating apparatus whereby the above-outlined and additional operating features thereof are attained.

The invention, both as to its organization and method of operation, together with further objects and advantages thereof, will best be understood by reference to the following specification taken in connection with the accompanying drawings.

BRIEF DESCRIPTION OF THE DRAWINGS

FIG. 3 is an enlarged view in vertical section of the heat-sealing portion of the strapping apparatus taken generally along the line 3—3 in FIG. 1;

FIG. 4 is a fragmentary bottom plan view of the pressure block of the strapping apparatus of the present invention, taken along the line 4—4 in FIG. 3;

FIG. 5 is a fragmentary top plan view of the fixed anvil block of the strapping apparatus of the present invention, taken along the line 5—5 in FIG. 3;

FIG. 6 is an enlarged fragmentary view in vertical section, illustrating the overlapping strap portions between the pressure members immediately after the strap heater has been removed from therebetween;

FIG. 7 is a view, similar to FIG. 6, but with the overlapping strap portions not shown, illustrating the position of the pressure members during the sealing and embossing operation;

FIG. 8 is an enlarged, fragmentary, front perspective view of a portion of the corrugated seal joint formed in the overlapping strap portions by the pressure members when they are moved to the position illustrated in FIG. 7;

FIG. 9 is a fragmentary view in vertical section similar to FIG. 3, illustrating the sealing apparatus in the strap-heating configuration thereof;

FIG. 9A is a fragmentary side elevational view of the cam shaft of the sealing mechanism in the configuration illustrated in FIG. 9;

FIG. 10 is a view similar to FIG. 9, showing the heat-sealing apparatus disposed in the sealing configuration thereof; and FIG. 10A is a side elevational view similar to FIG. 9A of the cam shaft in the configuration illustrated in FIG. 10.

DESCRIPTION OF THE PREFERRED EMBODIMENT

Figure 1:
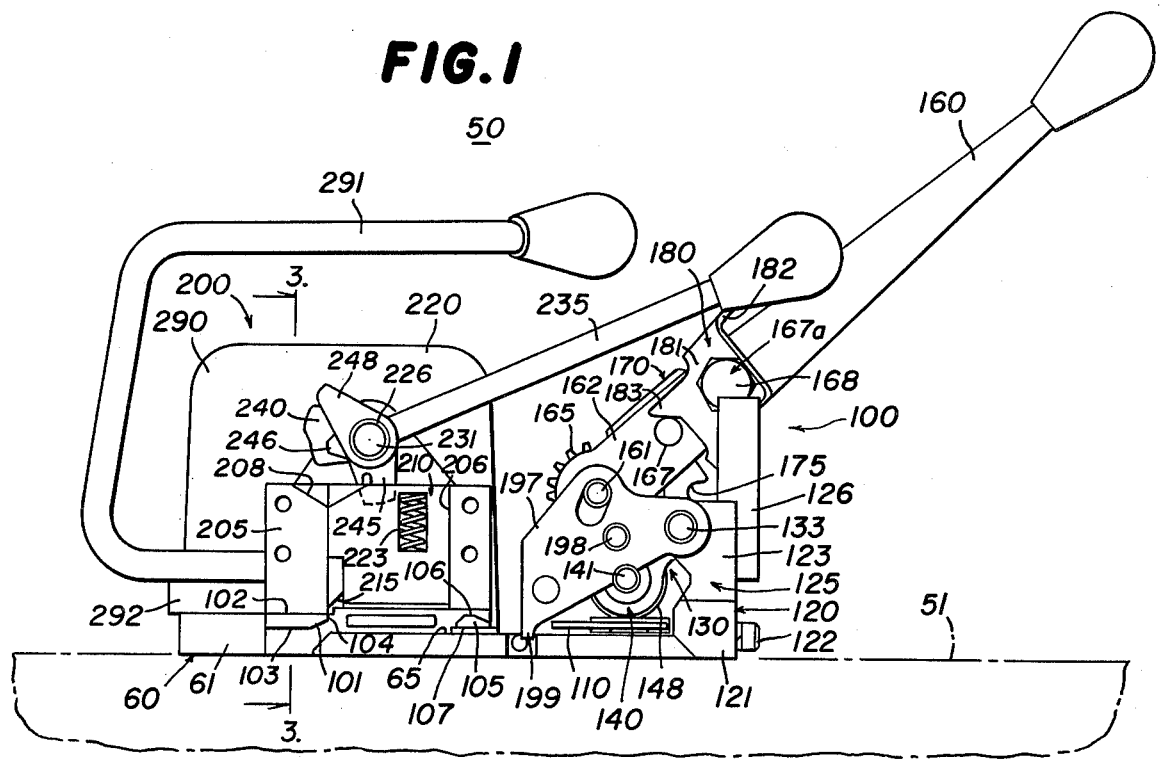
FIG. 1 is a side elevational view of the strapping apparatus of the present invention with the tensioning handle shown in an unlatched position and with the sealing handle shown in its home position and with portions of the apparatus removed more clearly to show the internal construction thereof.

Referring now in particular to FIGS. 1 and 3 of the drawings, there is illustrated a strapping apparatus consisting of a combination tensioning and heat-sealing tool constructed in accordance with and embodying the features of the present invention, and generally designated by the numeral 50. The combination tool 50 is an improvement of the tool disclosed in my aforementioned copending U.S. Application Ser. No. 701,306.

Indeed, mechanically the combination tool 50 is identical in construction to the tool of that copending application and, therefore, parts of the mechanical construction and operation of the tool 50 may be described herein only briefly, the detailed description being found in said copending application and in the aforementioned U.S. Pat. No. 3,944,460, the disclosures of said copending application and prior patent being incorporated herein by reference.

In FIG. 1 the combination tool 50 is illustrated in its operative position for applying a length of plastic strap, such as polypropylene strap for example, in a tensioned loop about a package or other object 51, the strap being disposed in the combination tool 50 so that the supply portion 57 of the strap is disposed in overlapping relationship with the leading end 56 thereof. The combination tool 50 includes a common baseplate, generally designated by the numeral 60, on which is mounted gripping and tensioning apparatus, generally designated by the numeral 100, and heat-sealing and shearing apparatus, generally designated by the numeral 200.

The baseplate 60 includes a main body 61 of a predetermined thickness and having formed therein toward the rear portion thereof a generally L-shaped heater control recess 62, and a generally rectangular tensioning apparatus recess in the front portion thereof, the heater control recess 62 having a pair of spaced-apart parallel rails 70 therein extending laterally thereof (one shown in FIG. 3). Formed along one side of the baseplate 60 is an anvil block 64 having a flat upper strap guide surface or apron 65. A heat buffer 66 may be received in a complementary recess 67 adjacent to the inner edge of the anvil block 64.

The gripping and tensioning apparatus 100 includes an elongated rear strap spacer 101 secured to the baseplate 60 adjacent to the rear end thereof and projecting laterally therefrom at the rear end of the strap guide apron 65. The rear strap spacer 101 has a flat planar upper guide surface 102 and a flat planar lower guide surface 103 spaced apart a predetermined distance, both of the surfaces 102 and 103 being disposed substantially parallel to the strap guide apron 65 and spaced vertically therefrom. Formed along the front edge of the rear strap spacer 101 and extending substantially normal to the longitudinal axis of the strap guide apron 65 is a fixed shear blade 104. Secured to the baseplate 60 and spaced a predetermined distance forwardly of the rear strap spacer 101 and extended substantially parallel thereto is an elongated front strap spacer 105 having upper and lower strap guide surfaces 106 and 107 which are respectively substantially coplanar with the strap guide surfaces 102 and 103 on the rear strap spacer 101. Disposed adjacent to the front end of the strap guide apron 65 substantially parallel thereto is a separating plate, generally designated by the numeral 110, and fixedly secured adjacent to the inner end thereof by mounting bolts to the baseplate 60.

A cradle support member, generally designated by the numeral 120, includes an angle attachment bracket 121 secured by means of mounting screws 122 to a cradle support mounting block (not shown). Integral with the attachment bracket 121 and extending upwardly therefrom at the end thereof adjacent to the strap guide apron 65 is a cradle clevis 125 having an upwardly extending bight portion 123 and a pair of spaced-apart rearwardly extending legs (not shown). Integral with the bight portion 123 of the cradle clevis 125 and extending upwardly therefrom is a mounting post 126. Mounted on the cradle support member 120 is a cradle, generally designated by the numeral 130, pivotally mounted on the cradle support member 120 by a pivot pin 133, and resiliently urged toward rotation in a counterclockwise direction about the pivot pin 133, as viewed in FIG. 1.

Carried by the cradle 130 is a rotary dog assembly, generally designated by the numeral 140, and including an elongated rotary dog shaft 141 disposed in a complementary bore extending completely therethrough. Fixedly secured to the shaft 141 adjacent to one end thereof is a rotary dog 148 disposed in a complementary shaped recess in the cradle 130. The cylindrical outer surface of the rotary dog 148 is serrated or knurled and projects from the cradle 130 at the bottom thereof for engagement with the supply portion 57 of the strap.

Disposed in and extending through a complementary bore in the cradle 130 is a handle pivot pin 161 having one end thereof extending a predetermined distance outwardly beyond the adjacent end of the cradle body 131, and through complementary openings adjacent to the lower ends of inner and outer elongated handle plates 162, the upper ends thereof having sandwiched therebetween the lower end of a tensioning handle 160. Coaxially mounted on the pivot pin 161 between the handle plates 162 is a drive gear 165 disposed for meshing engagement with the outer teeth on another drive gear (not shown). The handle 160 and the handle plates 162 are all secured together by two bolts, one 167 and 167a, the bolt 167a having an enlarged spacer head 168.

The lower end of the tensioning handle 160 has a recess formed in the inner side surface thereof, in which is received a pawl member, generally designated by the numeral 170, having an opening therein through which is received the bolt 167 for pivotally mounting the pawl member 170. The pawl member 170 is provided with a pawl tooth disposed for ratcheting engagement with the teeth of the drive gear 165 to prevent rotation thereof in a clockwise direction, as viewed in FIG. 1. The lower end of the pawl member 170 projects downwardly and forwardly beneath the handle plates 162 and 163 and has formed thereon an arcuate seat 175 and a camming surface (not shown).

A positioning lever, generally designated by the numeral 180, has a flat side plate 181 which is disposed in use parallel to the inner handle plate 162 and is secured to the outer surface thereof by the bolt 167a for pivotal movement with respect thereto. Integral with the side plate 181 and extending upwardly therefrom substantially normal thereto a predetermined distance above the tensioning handle 160 is a handle portion 182 for manipulating the positioning lever 180. Projecting downwardly and rearwardly from the side plate 181 is a stop finger 183 disposed for engagement with the head of the bolt 167, for limiting pivotal movement of the positioning lever 180 in the counterclockwise direction, as viewed in FIG. 1. Both the pawl member 170 and the positioning lever 180 are simultaneously resiliently urged toward rotation in a counterclockwise direction, as viewed in FIG. 1 by spring means (not shown).

Respectively secured to the opposite ends of the cradle 130 by means of screws 198 are two end plates 197 which securely hold in place the pivot pins 133 and 161 and the shaft 141. Projecting downwardly from the rear end of one of the side plates 197 is a strap guide finger 199 which projects a slight distance downwardly below the surface of the strap guide apron 65 adjacent to the outer edge thereof for guiding the strap and confining it to a path overlying the strap guide apron 65.

The sealing and shearing apparatus 200 is mounted on an irregularly shaped frame or housing 201 which is fixedly secured to the baseplate 60 and overlies the heater control recess 62 therein. The frame 201 is provided with a relatively thick upwardly extending end wall 205 overlying the strap guide apron 65 and spaced a predetermined distance thereabove and a relatively thin upstanding end wall 207 adjacent to the opposite side of the baseplate 65 and an upstanding bearing wall 203 disposed between the end walls 205 and 207 substantially parallel thereto. The bottom of the bearing wall 203 is disposed well above the baseplate 60 and has formed thereon, at the side thereof facing the end wall 207, a downwardly extending lip or projection 202. Disposed between the end wall 205 and the bearing wall 203 are two longitudinally spaced-apart cylindrical bearing turrets 204 extending coaxially with each other and substantially parallel to the walls 203 and 205.

Formed in the outer surface of the end wall 205, between the front and rear strap spacers 105 and 101, is a deep slot or channel 206 substantially rectangular in transverse cross-section, the inner wall of the channel 206 in turn having formed therein adjacent to the rear end thereof a narrow elongated slot 209. The rear upper surface of the end wall 205 has an inclined surface 208 which slopes downwardly and forwardly to the channel 206, for a purpose to be described below.

Disposed in the channel 206 is a complementary-shaped pressure block, generally designated by the numeral 210, having at the upper rear end thereof an inclined cam surface 211 which slopes downwardly and rearwardly to the rear surface of the pressure block 210 adjacent to the lower edge of the inclined surface 208. Extending vertically through the pressure block 210 inwardly of the cam surface 211 is a cylindrical bore 212 having disposed in the lower end thereof a regulating screw 213. Disposed in the bore 212 above the screw 213 in engagement therewith is a coil compression spring 214, upon the upper end of which is seated a plunger member 216 which normally projects a predetermined distance upwardly above the top surface of the pressure block 210. Preferably, the plunger 216 is provided with an enlarged base portion 216a adapted for engagement with a complementary shoulder (not shown) in the bore 212 for limiting the upward movement of the plunger 216 under the urging of the compression spring 214. Preferably, the modulus of elasticity of the compression spring 214 is relatively high, the amount of force necessary to depress the plunger 216 against the urging of the bias spring 214 being variable by adjustment of the regulating screw 213.

A shear blade 215 is disposed in a complementary recess 217 and the rear surfaces of the pressure block 210 and is fixedly secured thereto by means of a mounting screw 218, the inner end of the shear blade 215 projecting inwardly beyond the inner surface of the pressure block 210 and being accommodated in the slot 209. The shear blade 215 is disposed in use a very slight distance forwardly of the shear blade 104 on the rear strap spacer 101 for cooperation therewith to sever the supply portion of the strap in a manner to be described more fully below.

A generally rectangular end plate 220 is secured to the outer surface of the end wall 205, the inner surface of the end plate 220 having formed therein a vertically extending part-cylindrical recess 222 receiving therein the outer portion of a vertically extending coil compression spring 223, the inner portion of which is received in a complementary part-cylindrical opening or recess 219 in the outer surface of the pressure block 210, the compression spring 223 serving to inhibit vertical movement of the pressure block 210. Also formed in the inner surface of the end plate 220 and extending upwardly from the bottom end thereof is an elongated slot 224 for accommodating therein the outer end of the shear blade 215 which projects outwardly beyond the outer surface of the pressure block 210.

Carried in the end plate 220 above the top of the end wall 205 is a bearing 226 having journalled therein the reduced diameter end 231 of an elongated cam shaft 230 which extends inwardly of the end plate 220 substantially normal thereto, the opposite end of the cam shaft 230 also being provided with a reduced diameter portion 232 journalled in a bearing 233 in the bearing wall 203. A lever handle 235 is threadedly engaged with the cam shaft 230 and extends radially outwardly therefrom a slight distance inwardly of the end plate 220 for manually rotating the cam shaft 230 about the longitudinal axis thereof, the handle 235 being engageable with a roll pin (not shown) for limiting the rotating of the cam shaft 230 in a clockwise direction, as viewed in FIG. 1. Projecting from the cam shaft 230 are a number of cam lobes including (progressing from the inner end to the outer end of the cam shaft 230) a heater drive lobe 240 having a drive cam surface 241 and a first dwell surface 242 and a retract cam surface 243 and a second dwell surface 243a thereon, a heater latching lobe 245 having a cam surface 244 thereon, a pressure block plunger lobe 246 having a cam surface 247 thereon and a pressure block sealing lobe 248 having a cam surface 249 thereon.

A rocker arm, generally designated by the numeral 250 is disposed between the bearing turrets 204, the rocker arm 250 being fixedly secured to an elongated pivot pin 251 extending therethrough, the opposite ends of which pin are respectively received in complementary openings extending coaxially through the turrets 204 for pivotally mounting the rocker arm 250 thereon. The rocker arm 250 includes a downwardly extending coupling arm 252 having an opening therein through which is received a coupling bolt 253 secured in place by a nut 254. The rocker arm 250 is also provided with a drive cam member 255 projecting inwardly therefrom and having a camming surface 256 thereon disposed for engagement with the surfaces 241, 242, 243 and 243a of the cam lobe 240 on the cam shaft 230. The rocker arm 250 is also provided with a latch cam member 257 projecting upwardly and outwardly thereof and having thereon a camming surface (not shown) on the front side thereof disposed for engagement with the camming surface 244 of the cam lobe 245 on the cam shaft 230.

Disposed in the heater control recess 62 beneath the bearing wall 203 and the bearing turrets 204 is a heater carriage, generally designated by the numeral 260, provided with a pair of vertically spaced-apart flat retaining flanges 262 projecting therefrom toward the strap guide apron 65, the lower one of the retaining flanges 262 extending forwardly and rearwardly of the heater control recess 62 a sufficient distance so that the opposite ends thereof respectively rest upon the rails 70 for sliding engagement therewith. Formed in the heater carriage 260 is a generally rectangular connector recess 261 communicating with the space between the retaining flanges 262, the carriage 260 also having a pair of bearing arms 263 extending upwardly and outwardly therefrom in a direction opposite to the direction of the retaining flanges 262 and adapted for sliding engagement with the underside of the bearing wall 203, the distal ends of the bearing arms 263 being engageable with the lip 202 on the bearing wall 203 for limiting the sliding movement of the heater carriage 260 along the rails 70. The bearing arms 263 are spaced apart laterally of the heater carriage 260 (forwardly and rearwardly of the baseplate 60) and are interconnected at the inner ends thereof by a relatively small diameter roll pin 264 and a relatively large diameter latch pin 266.

Also disposed between the bearing arms 263 is a latch clip, generally designated by the numeral 265, and preferably formed of spring steel, the clip 265 being generally U-shaped and having a bight portion wrapped around the coupling bolt 253 on the rocker arm 250 and a pair of legs extending outwardly toward the distal ends of the bearing arms 263. The upper one of the legs of the latch clip 265 is bent adjacent to the distal end thereof downwardly toward the lower leg of the clip 265 to form a hook portion 268, the lower end of the hook portion 268 being normally spaced from the lower leg of the latch clip 265 a distance less than the diameter of the roll pin 264 and terminating in an upwardly inclined cam flange 269. Normally, the hook portion 268 of the latch clip 265 is hooked over the latch pin 266, as illustrated in FIG. 3, for coupling the heater carriage 260 to the rocker arm 250.

Disposed between the retaining flanges 262 of the heater carriage 260 substantially parallel thereto is an elongated electrically resistive heating element 270 projecting laterally well beyond the ends of the retaining flanges 262 toward the strap guide apron 65. The inner end of the heating element 270 is preferably provided with a pair of plugs or prongs (not shown) adapted to be received in complementary sockets in a crystal connector 275 which is received in the recess 261 in the heater carriage 260, the heating element 270 and the crystal connector 275 being respectively fixedly secured to the heater carriage 260 by means of mounting screw 272 and 273. The crystal connector 275 is in turn provided with a pair of terminals 274 to which may be connected with conductors $L_1$ and $L_2$ of an A.C. 115-volts, 60 Hz., single phase, electrical power input line 293 (see FIG. 2). Fixedly secured to the inner surface of the bearing wall 203 by means of a mounting screw 277 is one end of a coil torsion spring 276, the other end of which forms a return spring leaf 278 disposed for engagement with the rear end of the latch pin 266 which projects rearwardly from the heater carriage bearing arms 263 for resiliently urging the heater carriage 260 toward a retracted position, illustrated in FIG. 3, wherein the distal ends of the bearing arms 263 are disposed in engagement with the lip 202 on the bearing wall 203.

Disposed between the end wall 207 and the bearing wall 203 of the frame 201 is a fan or blower assembly, generally designated by the numeral 280, which includes an electric motor 281, which is preferably a single phase induction motor of the shaded pole type spaced from the end wall 207 by a pair of cylindrical spacers 282 through which are received mounting screws for fixedly mounting the motor 281 on the end wall 207. The motor 281 has an output shaft 285 projecting inwardly therefrom substantially perpendicular to the bearing wall 203. The opposite ends of the shaft 285 are respectively journalled in bearings 286 fixedly secured to the opposite sides of the motor pole plates by a bracket 289. Fixedly secured to the shaft 285 inwardly of the inner bearing 286 is a fan blade assembly 287 for directing a stream of cooling air inwardly of the sealing and shearing apparatus 200 when the fan motor is energized for cooling the apparatus and removing therefrom vapors caused by the heating of the strap 55.

The entire portion of the heating and sealing apparatus 200 from the inner surface of the end wall 205 to the end wall 207 is enclosed by a cover 290 which is preferably formed of plastic, but which may be formed of any suitable material, the cover 290 being provided with a series of louvers 295 in the upper surface thereof overlying the fan assembly 280 permitting cooling air to be drawn into the heating and sealing apparatus 200 by the fan blade 287. Mounted in the top of the cover 290 is an electrical light source 297, which may be a light-emitting diode, and is adapted to be connected to and energized by the source of A.C. electric current for indicating when the heater is turned on.

The combination tool 50 is preferably also provided with a utility handle 291 for transporting the tool, the handle 291 being provided at one end thereof with a generally rectangular coupling block 292 receivable in a complementary opening at the rear end of the frame 201 in the housing 290 for lifting the apparatus 50, the handle 291 being readily removable from the apparatus when the apparatus is in use so as not to interfere with the operation of the tensioning handle 160 and the cam shaft lever handle 235.

Referring to FIGS. 4 through 8 of the drawings, the guide surface 65 of the anvil block 64 has formed therein at the rear end thereof a plurality of elongated parallel grooves or channels 300 which extend longitudinally of the anvil block 64 from the rear end thereof to rounded forward ends 303, the channels 300 being respectively separated from one another by a plurality of narrow elongated parallel ribs 301. The ribs 301 are respectively provided with flat upper surfaces 302 which are substantially coplanar with the guide surface 65. The channels 300 are identically dimensioned, as are the ribs 301, the channels 300 having a width several times as great as the width of the ribs 301.

The pressure block 210 is provided with a flat bottom surface 304 directly overlying the strap guide surface 65 of the anvil block 64 substantially parallel thereto. Projecting downwardly from the bottom surface 304 are a plurality of longitudinally extending and laterally spaced-apart parallel ribs 305 which are, respectively, substantially identical in transverse cross section to the ribs 301 on the anvil block 64. The ribs 305 serve to define a plurality of parallel channels 306 therebetween along the botton surface 304 of the pressure block 210, the bottom surfaces 307 of the ribs 305 being substantially coplanar. The ribs 305 are equidistantly spaced apart and are so arranged as to be respectively disposed centrally of the channels 300 in the anvil block 64, the ribs 301 on the anvil block 64 being in turn respectively disposed centrally of the channels 306.

In operation, it will be appreciated that when the overlapping strap portions 56 and 57 are pressed together between the anvil block 64 and the pressure block 210, the ribs 301 and 305 cooperate to deform the overlapping and bonded-together strap portions 56 and 57 into the channels 306 and 300, thereby to form in the supply portion 57 of the strap a plurality of grooves or valleys 312 separated by and alternating with ridges 311, and to form in the leading end 56 of the strap a plurality of grooves or valleys 314, separated by and alternating with ridges 313, thereby to form a substantially corrugated joint 310, as best seen in FIG. 9.

Figure 2:
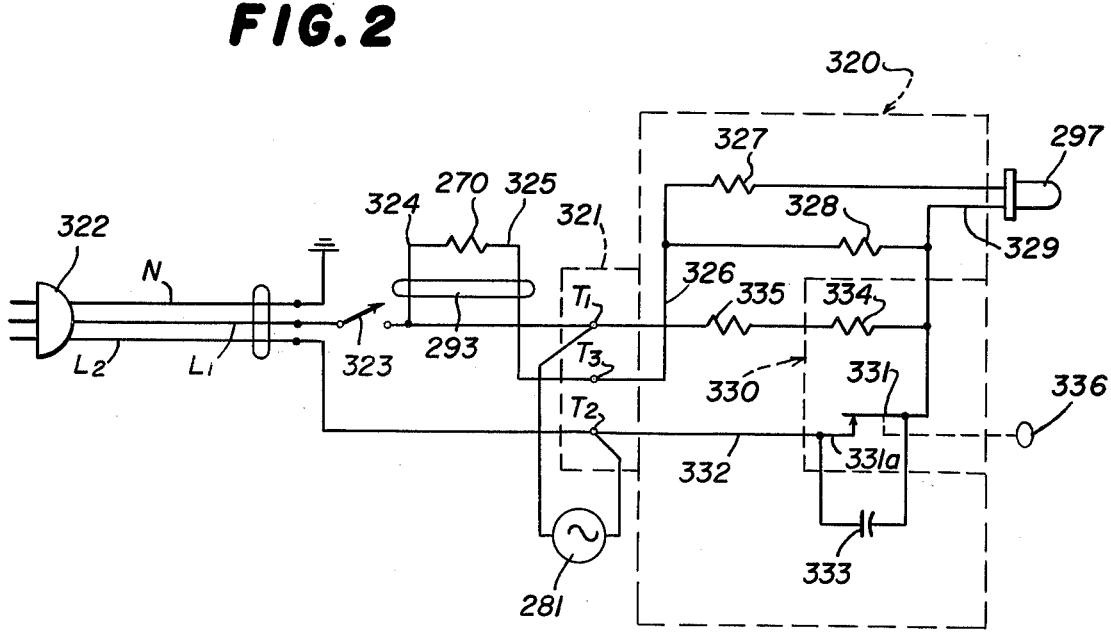
FIG. 2 is a schematic electrical circuit diagram of the temperature regulating apparatus of the present invention.

Referring now to FIG. 2 of the drawings, there is disclosed a temperature regulating assembly, generally designated by the numeral 320, for use in regulating the temperature of the heating element 270 and maintaining it at a constant predetermined temperature. The regulating assembly 320 may be provided with a terminal block 321 having terminals $T_1$, $T_2$ and $T_3$. The regulating assembly 320 is adapted to be used with the associated source of 120-volts A.C. electric power which energizes the heating element 270, which power source may be of the standard three-wire type including conductors $L_1$ and $L_2$ and a grounded neutral conductor N. The conductor $L_2$ is connected to the terminal $T_2$ of the terminal block 321, while the conductor $L_1$ is connected through an ON-OFF switch 323 to the terminal $T_1$. It will be understood that the conductors $L_1$, $L_2$ and N are preferably formed into a single cord which may be provided with a suitable three-pronged plug 322 for plugging into a standard grounded wall outlet.

The heating element 270 has one terminal thereof connected by a conductor 324 to the conductor $L_1$ intermediate the "ON-OFF" switch 323 and the terminal $T_1$, and the other terminal thereof connected by a conductor 325 to the terminal $T_3$ of the terminal block 321, which is in turn connected by a conductor 326 through a resistor 327 to one terminal of the light source 297, the other terminal of which is connected by a conductor 329 to a bimetallic relay, generally designated by the numeral 330. A resistor 328 is connected in parallel with the series combination of the resistor 327 and light source 297. The conductors 324 and 325 form the cord 293 illustrated in FIG. 3.

The bimetallic relay 330 includes a pair of normally closed bimetallic contacts 331 and 331a which are respectively connected to the conductor 329 and a conductor 332, the latter in turn being connected to the terminal $T_2$ of the terminal block 321. Connected across the bimetallic contacts 331 and 331a is a spark-suppression capacitor 333. The bimetallic relay 330 also includes a reference heating element 334 which has one terminal thereof connected to the conductor 329 and the other terminal thereof connected to one terminal of a resistor 335, the other terminal of which is connected to the terminal $T_1$ of the terminal block 321. The motor 281 of the blower assembly 280 may be connected across the conductors $L_1$ and $L_2$, preferably at the terminals $T_1$ and $T_2$ of the terminal block 321. Preferably, the bimetallic contacts 331 and 331a are provided with an adjustment screw, diagrammatically illustrated at 336, for adjusting the temperature at which said contacts will open and close.

It will be appreciated that the heating element 334 of the bimetallic relay 330 is connected in parallel with the heating element 270 and is so valued as to be heated to a temperature which is proportional to the temperature of the heating element 270. The bimetallic contacts 331 and 331a are disposed in proximity to the heating element 334 and are responsive to the temperature thereof.

When the ON-OFF switch 323 is closed and the bimetallic contacts 331 and 331a are in their normally closed position, as illustrated in FIG. 2, it will be understood that the heating elements 270 and 334 are energized and will be simultaneously heated, the light source 297 and the blower motor 281 also being energized. When the heating element 334 has been heated to a predetermined reference temperature, the heating element 270 will be heated to a corresponding proportional predetermined temperature which is the desired optimum temperature for operation of the strapping tool 50. The bimetallic contacts 331 and 331a are responsive to the heating of the heating element 334 to this reference temperature for moving to an open condition, thereby de-energizing the heating elements 270 and 334 which, thereupon, immediately begin to cool in the cooling stream of air generated by the blower assembly 280, which remains in operation because the blower motor 281 is connected directly across the lines $L_1$ and $L_2$ and bypasses the switch contacts 331 and 331a. The switch contacts 331 and 331a are very sensitive and as soon as the temperature of the heating element 334 has cooled below the predetermined reference temperature, the switch contacts 331 and 331a will immediately reclose for re-energizing the heating elements 270 and 334 for heating to the predetermined reference temperature.

This operation will continue, with the bimetallic switch contacts 331 and 331a opening and closing approximately twenty to thirty times a minute, thereby effectively to maintain the temperature of the heating element 270 at the predetermined operating temperature thereof. Since the maintenance of the temperature of the heating element 270 is dependent solely upon the temperature of the heating element 334, it is substantially independent of variations in the voltage of the electric power source, the voltage affecting only the speed at which the heating element heats up and, therefore, the frequency at which the bimetallic switch contacts 331 and 331a open and close. Preferably, the heating element 334 is arranged so that if it were to be continually energized, it would heat to a temperature above the predetermined reference temperature.

The operation of the combination tool 50 will now be described in detail. Initially, the plug 322 of the apparatus 50 is plugged into a 110–120 VAC outlet, the "ON-OFF" switch 323 is closed and the heating element 270 is allowed to heat up to the desired operating temperature which, in the preferred embodiment of this invention, is at least 725° F., and is set by appropriate adjustment of the bimetallic relay contacts 331 and 331a by the adjusting screw 336. Plugging in of the plug 322 also energizes the fan motor 281 and the indicator light 297. The tool 50 is then placed by use of the utility handle 291 atop the object 51 to be strapped, as shown in FIG. 1, with the operator preferably being positioned behind the tool 50 (to the left as viewed in FIG. 1), and the handles 235 and 160 are placed in their forwardmost positions, i.e., with the handle 235 resting upon the roll pin 225, and with the tensioning handle 160 latched in a downward position by means not shown.

During this downward latching movement of the tensioning handle 160, it acts as a first order lever with the fulcrum being the pivot pin 133 for exerting an upward force against the pivot pin 161 to lift the entire cradle 130 and pivot it about the axis of the pivot pin 133 against the urging of a tension spring. As the cradle 130 is pivoted upwardly, the outer end of the plate 110 is lifted up a predetermined distance above the strap guide apron 65 by means not shown. In this position, the pawl member 170 will have been pivoted out of engagement with the drive gear 165.

When the tensioning handle 160 has been latched in its downward position, the leading end 56 of a length of plastic strap is inserted forwardly along the strap guide apron 65 and beneath the rear guide member 101 and the front guide member 105 and the raised separating plate 110 and inwardly of the raised guide projection 199 on the side plate 197 until the leading end 56 projects a slight distance forwardly of the separating plate 110. With the leading end 56 of the strap thus positioned in the combination tool 50, the handle portion 182 of the positioning lever 180 is depressed toward the tensioning handle 160, thereby pivoting the positioning lever 180 about the axis of the bolt 167a against the urging of a compression spring (not shown) for releasing the tensioning handle 160 from its latched position.

The cradle 130 is now pivoted back downwardly in a counterclockwise direction, as viewed in FIG. 1, about the axis of the pivot pin 133 until the enlarged head 168 of the bolt 167a engages a spring-biased, rearwardly-projecting detent for limiting further upward movement of the tensioning handle 160, the application of further manual force to the tensioning handle 160 being necessary to depress the detent and move the tensioning handle 160 back up past its detent position. The movement of the tensioning handle 160 from its latched position back up to the detent position permits the separation plate 110 to return to its original position wherein it operates for securely clamping the leading end 56 of the strap.

It will be noted that when the apparatus is in the detent position, the cradle 130 has not been fully lowered to its original position and the rotary dog 148 remains spaced a slight distance above the separating plate 110 to accommodate the passage of the supply portion 57 of the strap therebetween. Also it will be noted that in this position, the strap guide finger 199 on the side plate 197 will also be disposed a predetermined distance above the strap guide apron 65 to accommodate insertion of the supply portion 57 of the strap from the side of the tool 50. Thus, at this point, the supply portion 57 of the strap is slid into place between the separating plate 110 and the rotary dog 148 and above the rear guide member 101 and the front guide member 105. In this position, it will be noted that the portions of the leading end 56 and supply portion 57 of the strap extending between the front and rear guide members 101 and 105 are vertically spaced apart thereby and are disposed in overlapping relationship therebetween, all for a purpose to be described more fully below.

At this point, the tensioning handle 160 is manually pulled back up past the detent position thereof, thereby pivoting the cradle 130 back down to its original position, as illustrated in FIG. 1, wherein the serrated peripheral surface of the rotary dog 148 cooperates with an insert in the separating plate 110 firmly to grip therebetween the supply portion 57 of the strap. When the tensioning handle 160 has been moved back to the positions illustrated in FIG. 1, it will be noted that the strap guide finger 199 on the side plate 197 has been moved back down into its original position extending below the surface of the strap guide apron 65 for preventing the strap from being displaced laterally from the combination tool 50. In addition, it will be noted that as the tensioning handle 160 moves up past the detent position thereof, the pawl member 170 is moved back into engagement with the teeth of the drive gear 165.

At this point, the strap which is looped about the object 51 may be tensioned by a back-and-forth movement of the tensioning handle 160 between the position illustrated in FIG. 1 and a rearward position in engagement with the cover 290, the operator preferably operating the tensioning handle 160 with his left hand while he grips the handle 235 with his right hand. As the handle 160 is moved rearwardly, in a counterclockwise direction as viewed in FIG. 1, the drive gear 165 is rotated in a clockwise direction by engagement therewith of the pawl 170, thereby resulting in rotation of drive mechanism (not shown) to effect a corresponding rotation of the rotary dog shaft 141 and the rotary dog 148 for moving the supply portion 57 of the strap rearwardly of the combination tool 55, thereby taking up slack in the strap and effecting tensioning thereof. When the tensioning handle 160 has reached the limit of its rearward travel, it is moved back forwardly to the position illustrated in FIG. 1 for another stroke, with the pawl 170 ratcheting over the teeth of the drive gear 165 during this forward movement of the handle 160. This tensioning operation continues until the desired tension in the strap has been achieved.

When the strap has been sufficiently tensioned, the operator grips the tensioning handle 160 with his left hand and grips the cam shaft lever handle 235 with his right hand and moves the handle 235 rearwardly in a counterclockwise direction, as viewed in FIG. 1, for sealing the overlapping portions 56 and 57 of the strap and severing the supply portion thereof. Preferably, the sealing and shearing operation is effected by a single continuous movement of the handle 235 from the position illustrated in FIGS. 1 and 3 to the position illustrated in FIG. 10, which movement preferably takes approximately two seconds, thereby effecting a counterclockwise rotation of the cam shaft 230, as viewed in FIG. 1, for sequentially effecting a series of operations.

When the lever handle 235 is in its initial or home position, illustrated in FIGS. 1 and 3, it rests upon a roll pin (not shown), with none of the cam lobes on the cam shaft 230 being in engagement. The latch clip 265, the rocker arm 250, the heater carriage 260 and the pressure block 210 are all disposed in the positions illustrated in FIG. 3.

During about the first thirty degrees of the rearward movement of the handle 235, the cam surfaces on the cam shaft 230 engage the cam surfaces on the rocker arm drive cam 255 and the plunger 216 to effect a cammed movement of the heating element 270 to a fully extended position between the strap portions 56 and 57 in the position illustrated in FIG. 9, with the distal end of the upper retaining flange 262 bearing against the inner surface of the end wall 205 for limiting the outward movement of the heater carriage 260 and the heating element 270, all as is described in greater detail in my aforementioned copending application.

As the backward motion of the handle 235 continues, the pressure block 210 bottoms out against the supply portion 57 of the strap and cooperates with the strap guide apron 65 for firmly pressing therebetween the overlapping portions 56 and 57 of the strap with the heater element 270 therebetween. When the overlapping portions 56 and 57 of the strap are thus firmly pressed into contact with the heating element 270, the surfaces thereof in contact with the heating element 270 are melted.

As the rearward movement of the handle 235 continues, the pressure block 210 and the heater carriage 260 are permitted to return to their retracted positions shown in FIG. 3, respectively, under the urging of the compression spring 223 and the return spring 276, all as is described in greater detail in my aforementioned copending application. Further rearward movement of the handle 235 brings the cam surface 249 of the cam lobe 248 into camming engagement with the cam surface 211 on the pressure block 210, again forcing the pressure block 210 downwardly against the urging of the compression spring 223 to a sealing condition illustrated in FIGS. 7 and 10. As this downward movement of the pressure block 210 continues, the melted surfaces of the overlapping portions 56 and 57 of the strap are brought into engagement with each other and are firmly pressed together between the ribs 305 of the pressure block 210 and the ribs 301 of the strap guide apron 65 of the anvil block 64 to effect a firm corrugated heat-sealed joint 310 between the overlapping strap portions 56 and 57 which are accommodated by the channels 300 and 306, as is also described in greater detail in my aforementioned copending application. As the pressure block 210 bottoms out, in the position illustrated in FIG. 11, the shear blade 215 passes downwardly past the shear blade 104 and cooperates therewith to sever the supply portion 57 of the strap at the rear guide member 201.

At this point, the heat-sealed joint in the strap has been completed and the operator moves the tensioning handle 160 with his left hand all the way forward to the latched position, for again elevating the cradle 130 and the separating plate 110 and the strap guide finger 199 to permit removal of the strap from the strap-gripping apparatus 100. Then, with his right hand, the operator moves the handle 235 back to the forward position thereof illustrated in FIG. 3, thereby permitting the pressure block 210 to return upwardly to its original position under the urging of the compression spring 223. This forward movement of the handle 235 also brings the camming surface 244 of the cam lobe 245 into engagement with the latch cam 257 on the rocker arm 250 for pivoting the rocker arm 250 and the latch clip 265 back to the positions illustrated in FIG. 3. With the handles 235 and 160 now returned to their forwardmost positions, the combined tool 50 can be moved sideways to strip it from the strap and the object 51 by use of the utility handle 291.

In a constructional model of the temperature regulating apparatus 320 of the present invention, the components of the temperature regulating apparatus 320 may be mounted on a printed circuit board. The movable heater element 270 is designed to operate at a temperature in a range of about 725° to about 850° F. and may have a resistance of approximately 120 ohms. The bimetallic relay 330 is designed to operate at a maximum temperature of approximately 200° F. when connected across a 115-volt, 60 cycle A.C. source. Thus, the ratio of the operating temperatures of the heating elements 270 and 334 is approximately 4 to 1. The heating element 334 has a resistance of approximately 2800 ohms, the resistor 327 is rated at approximately 10 ohms, ¼ watt, the resistor 328 is rated at approximately 3 ohms, 5 watts, and the resistor 335 is rated at approximately 1,000 ohms, 1 watt. The capacitor 333 is preferably a 0.015 microfarad, 1 KV capacitor.

From the foregoing, it can be seen that there has been provided an improved combination strapping tool for both gripping and tensioning a length of plastic strap about an object and then forming a heat-sealed bonded joint between the ends of the length of strap and severing the length of strap from the supply thereof.

More particularly, there has been provided a combination strapping tool of the character described, which includes temperature regulating apparatus for accurately maintaining the temperature of the heating means for forming the heat-sealed bond at a predetermined operating temperature.

There has also been provided a combination strapping tool of the character described, wherein the temperature regulating apparatus includes reference heating means connected across the joint-forming heating element and adapted to be heated to a temperature proportional to the temperature of the joint-forming heating element, and temperature-responsive switch means responsive to the heating of the reference heating means to a predetermined reference temperature for de-energizing the joint-forming heating element and reference heating means and for re-energizing them when the temperature of the reference heating means drops below the reference temperature.

There has also been provided a temperature regulating apparatus of the type set forth, wherein the temperature of the joint-forming heating element is maintained independently of variations in the voltage of the electric power source.

While there has been described what is considered to be the preferred embodiment of the invention, it will be understood that various modifications may be made therein, and it is intended to cover in the appended claims all such modifications as fall within the true spirit and scope of the invention.

What is claimed is:

1. Strapping apparatus for securing a length of plastic strap around an object, said apparatus comprising a frame, strap-gripping means mounted on said frame for holding the strap encircled in a loop in a tensioned condition about the object with the leading end of the strap overlapping the supply portion thereof, an electric heating element disposed adjacent to the overlapping strap portions and adapted to be connected across an associated source of electric power for effecting melting of the facing overlapping portions of the strap, reference heating means adapted to be connected in parallel with said heating element for being heated at a rate such that the temperature of said reference heating means is proportional to the temperature of said heating element, and temperature-responsive switch means connected in series between the associated source and the parallel combination of said reference heating means and said heating element and in heat-transfer proximity to said reference heating means such that said switch means is controlled substantially solely by the temperature of said reference heating means, said switch means having a normal closed condition for energizing said heating element and said reference heating means and an open condition for de-energizing said heating element and said reference heating means, said switch means being responsive to the heating of said reference heating means to a reference temperature proportional to a predetermined temperature of said heating element for switching to the open condition thereof, said switch means being responsive to the cooling of said reference heating means below said reference temperature for switching to the closed condition thereof, and pressure means carried by said frame and movable for pressing together the melted overlapping portions of the strap to effect a joint therebetween, whereby there is provided uniform heating of the overlapping portions of the strap and the formation of a uniform joint therebetween independent of variations in the voltage of the associated source.

2. The temperature regulating apparatus set forth in claim 1, wherein said reference heating means is a resistance-type heating element.

3. The temperature regulating apparatus set forth in claim 1, wherein said switch means comprises bimetallic switch contacts.

4. The strapping apparatus set forth in claim 1, wherein said reference heating means and said temperature-responsive switch comprise a bimetallic relay.

5. The temperature regulating apparatus set forth in claim 1, and further including a spark-suppression capacitor connected across said switch means.

6. The temperature regulating apparatus set forth in claim 1, and further including first and second resistance means respectively connected in series with said heating element and said reference heating means.

7. The temperature regulating apparatus set forth in claim 1, wherein the ratio of the temperature of said heating element to the temperature of said reference heating means is approximately 4 to 1.

8. The temperature regulating apparatus set forth in claim 1, wherein said predetermined temperature of said switch means is manually adjustable for varying said heating element.

9. The strapping apparatus set forth in claim 1, and further including an indicator means connected in series with said heating element.

10. The strapping apparatus set forth in claim 1, and further including a blower apparatus mounted on said frame and connected directly across the associated source of electric power for directing a stream of air over said heating element and said pressure means for cooling thereof and for removal of vapors resulting from melting of the overlapping strap portions.

11. Strapping apparatus for securing a length of plastic strap around an object, said apparatus comprising a frame, strap-gripping means mounted on said frame for holding the strap encircled in a loop in a tensioned condition about the object with the leading end of the strap overlapping and spaced from the supply portion thereof, an electric heating element disposed adjacent to the overlapping strap portions and adapted to be connected across an associated source of electric power and movable between a strap-heating position and a retracted position, said heating element in the strap-heating position thereof being disposed between the overlapping portions of the strap for contact therewith to effect melting thereof, said heating element in the retracted position thereof being displaced from between the overlapping portions of the strap and out of contact therewith, actuating means mounted on said frame and coupled to said heating element for effecting movement thereof between the retracted position and the strap-heating position thereof, reference heating means adapted to be connected in parallel with said heating element for being heated at a rate such that the temperature of said reference heating means is proportional to the temperature of said heating element, and temperature-responsive switch means connected in series between the associated source and the parallel combination of said reference heating means and said heating element and in heat-transfer proximity to said reference heating means such that said switch means is controlled substantially solely by the temperature of said reference heating means, said switch means having a normal closed condition for energizing said heating element and said reference heating means and an open condition for deenergizing said heating element and said reference heating means, said switch means being responsive to the heating of said reference heating means to a reference temperature proportional to a predetermined temperature of said heating element for switching to the open condition thereof, said switch means being responsive to the cooling of said reference heating means below said reference temperature for switching to the closed condition thereof, and pressure means carried by said frame and movable for pressing together the melted overlapping portions of the strap to effect a joint therebetween after the return of said heating element to the retracted position thereof, whereby there is provided uniform heating of the overlapping portions of the strap and the formation of a uniform joint therebetween independent of variations in the voltage of the associated source.

12. The strapping apparatus set forth in claim 11, wherein said reference heating means and said temperature-responsive switch comprise a bimetallic relay.

13. In a heat-sealing strapping apparatus including an electric heating element connected across a source of electric power, temperature regulating apparatus for said heating element comprising reference heating means adapted to be connected in parallel with the associated heating element for being heated at a rate such that the temperature of said reference heating means is proportional to the temperature of the associated heating element, and temperature-responsive switch means connected in series between the associated source and the parallel combination of said reference heating means and the associated heating element and in heat-transfer proximity to said reference heating means such that said switch means is controlled substantially solely by the temperature of said reference heating means, said switch means having a normal closed condition for energizing the heating element and said reference heating means and an open condition for de-energizing the heating element and said reference heating means, said switch means being responsive to the heating of said reference heating means to a reference temperature proportional to a predetermined temperature of the associated heating element for switching to the open condition thereof, said switch means being responsive to the cooling of said reference heating means below said reference temperature for switching to the closed condition thereof, whereby the temperature of the associated heating element is maintained at said predetermined temperature independent of variations in the voltage of the associated source.

14. The temperature regulating apparatus set forth in claim 13, wherein said reference heating means and said temperature-responsive switch means comprise a bimetallic relay.

15. The temperature regulating apparatus set forth in claim 13, wherein the ratio of the temperature of the associated heating element to the temperature of said reference heating means is approximately 4 to 1.

16. The temperature regulating apparatus set forth in claim 13, wherein said switch means is manually adjustable for varying said predetermined temperature of the associated heating element.

* * * * *